United States Patent [19]
Gross

[11] Patent Number: 5,291,195
[45] Date of Patent: Mar. 1, 1994

[54] TARGET LIGHT FOR DOCKING

[75] Inventor: H. Gerald Gross, Santa Ana, Calif.

[73] Assignee: H. Koch & Sons Co., Anaheim, Calif.

[21] Appl. No.: 821,241

[22] Filed: Jan. 10, 1992

Related U.S. Application Data

[63] Continuation of Ser. No. 481,175, Feb. 20, 1990, abandoned.

[51] Int. Cl.$^5$ .............................................. G08B 21/00
[52] U.S. Cl. ............................... 340/958; 244/135 A; 244/161; 340/953; 342/23
[58] Field of Search ............... 340/942, 943, 947, 951, 340/952, 953, 954, 955, 958, 932.2, 976; 244/114 R, 161, 135 A; 342/23

[56] References Cited

U.S. PATENT DOCUMENTS

| | | | |
|---|---|---|---|
| 3,366,923 | 1/1968 | Panerai et al. | 340/947 |
| 3,767,309 | 10/1973 | Brown et al. | 356/138 |
| 3,794,270 | 2/1974 | Wilkens | 244/1 R |
| 3,878,506 | 4/1975 | Young | 340/953 |
| 3,910,533 | 10/1975 | Cheatham et al. | 244/161 |
| 4,477,796 | 10/1984 | Kearsley | 340/981 |
| 4,733,833 | 3/1988 | Shepherd | 244/114 R |
| 4,763,125 | 8/1988 | Newman et al. | 340/958 |

FOREIGN PATENT DOCUMENTS 8604437 7/1986 World Int. Prop. O. .......... 340/976

Primary Examiner—Jin F. Ng
Assistant Examiner—Brent A. Swarthout
Attorney, Agent, or Firm—David A. Greenlee

[57] ABSTRACT

A docking target (10) includes three concentric circles (C1, C2, C3) each comprising a plurality of different color light emitting diodes (D1, D2, D3) spaced about the circumference of each circle (C1, C2, C3). During vehicle approach, each circle appears initially as a light spot, then a continuous ring of light and finally a plurality of independent light points at defined distances of the vehicle (14) from the station (12) so that the operator can determine distance of the vehicle (14) to the target (10). The light emitting diodes (D1, D2, D3) on each circle, when visible, provide attitude information of the vehicle (14) with respect to the station (12) by the intensities of the light emitting diodes (D1, D2, D3) and the geometric shape produced thereby so that the operator can adjust the attitude of the vehicle (14) with respect to the station (12).

22 Claims, 3 Drawing Sheets

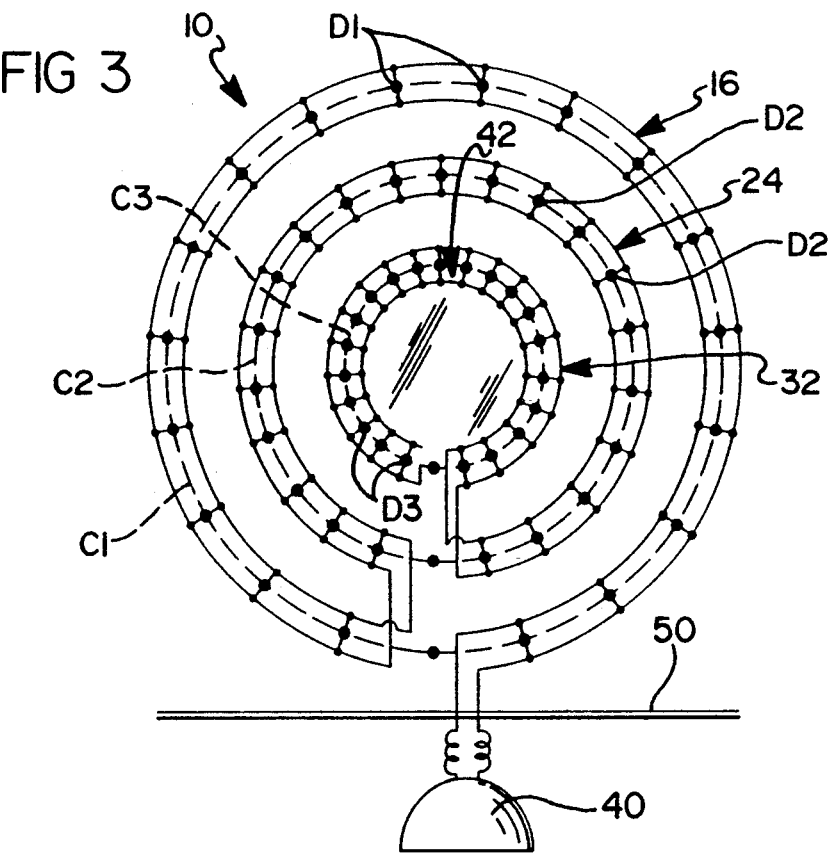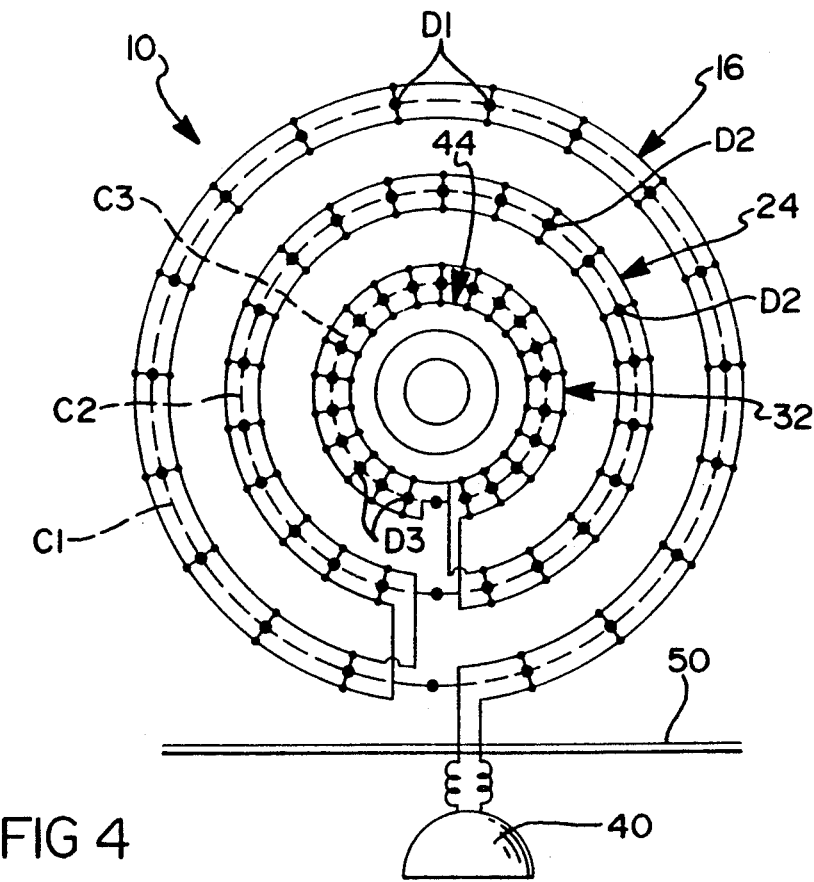

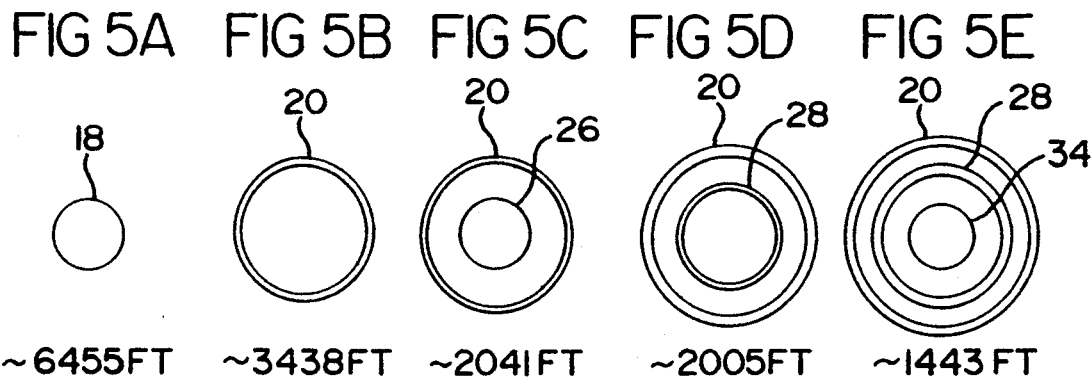
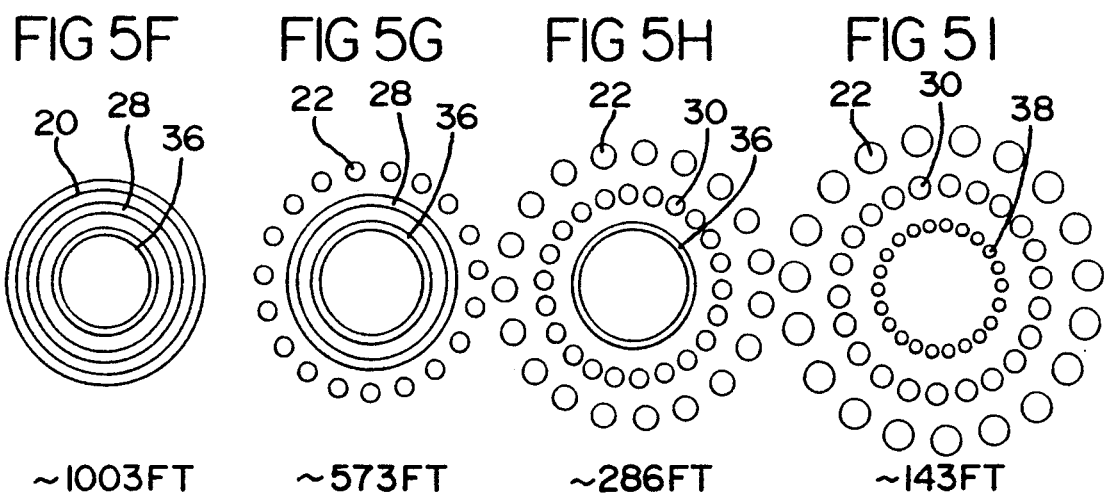
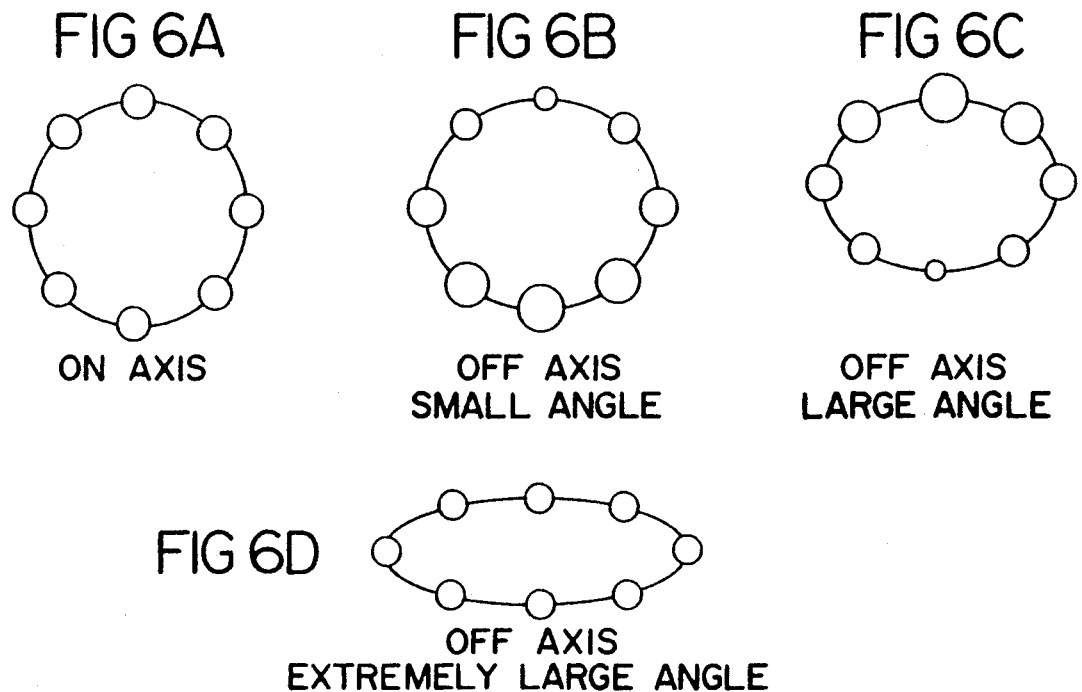

TARGET LIGHT FOR DOCKING

This application is a continuation of application Ser. No. 07/481,175, filed Feb. 20, 1990, now abandoned.

TECHNICAL FIELD

The invention relates to a target device which indicates position and attitude to an approaching vehicle.

BACKGROUND OF THE INVENTION

The approach of a vehicle to a station for docking requires the provision of information on distance and attitude relative to the station to facilitate docking. Instances where such information is required include backing trailer trucks to a loading dock, aircraft docking at airports, and space shuttle docking at a space station.

It is necessary to indicate both distance and attitude of a vehicle, such as a space shuttle, relative to the station during the approach. Microwave radar is useful for measuring distance at very close range but is not suitable for additionally measuring direction and relative attitude. A detection system for docking should be capable of indicating distance, azimuth and elevation. Of these components, distance can be readily measured by the use of microwave radar, but radar is not adapted for sensing the elevation and attitude of the vehicle.

Assembling a space station in sections and provisioning it prior to manning it necessitates many repeated dockings of a space vehicle with the station. The space station and vehicle are generally powered and in orbit. It is necessary to maneuver the powered vehicle to correct errors in course and range so that a soft docking of the vehicle at the space station can be made promptly. To conserve fuel, it is desirable to avoid the necessity of making difficult and prolonged computations before docking.

A lighted docking target has been utilized by the Skylab, comprising a single circular ring of lights composed of strips of the electroluminescent type. However, indication of on-axis and off-axis orientation or attitude was not provided by the target. Distance determination over a large range of distances was not provided.

U.S. Pat. No. 3,767,309 issued Oct. 23, 1973 to Brown et al discloses a guidance apparatus providing lateral and longitudinal visual guidance to the operator of the vehicle. A light projection apparatus and filter emits several multi-color, laterally disposed beam segments to provide a course guidance to the vehicle. However, no range information is provided. U.S. Pat. No. 3,910,533 issued Oct. 7, 1975 to Cheathem et al discloses a spacecraft docking and alignment system wherein a three dimensional target screen is mounted along the axis of one spacecraft and a television camera is installed along the axis of another spacecraft. The television displays the relative alignment of the two spacecrafts to the operator for docking maneuvering.

U.S. Pat. No. 3,794,270 issued Feb. 26, 1974 to Wilkens describes an apparatus for determining the relative attitude of two vehicles by using magnetic members in synchronization with each other. The attitude of a vehicle relative to an imaginary axis connecting the members is determined by sensing the orientation of a moveable magnet member relative to the vehicle in which it is mounted. The attitude and range of the vehicle can not be determined visually, but must be obtained from a computer.

None of the above patents describe a system which visually indicates to an operator of the vehicle the range and attitude of the vehicle to assist in docking the vehicle with a station.

SUMMARY OF THE INVENTION AND ADVANTAGES

The invention is a docking target assembly mounted on a station to visually indicate attitude and position to an approaching vehicle to assist its docking with the station. The assembly comprises a first position indicating means for emitting light of a first luminous intensity to indicate to the approaching vehicle a first predetermined range of distances between the approaching vehicle and the station. A second position indicating means is mounted adjacent the first position indicating means for emitting visible light of a second luminous intensity to indicate to the approaching vehicle a second predetermined range of distances between it and the station. Only the first indicating means is visible at the first range and both the first and second indicating means are visible at the second range.

The first position indicating means preferably comprise a plurality of geometrically-arranged spaced, discrete light emitting means of equal luminous intensity which indicate vehicle attitude by appearing at equal intensities at a predetermined correct vehicle docking attitude and at unequal intensities at other vehicle attitudes relative to the station.

The advantages include providing visual and immediate information about range and attitude to enhance soft docking of a vehicle by its operators.

BRIEF DESCRIPTION OF THE DRAWINGS

Other advantages of the present invention will be readily appreciated as the same become better understood by reference to the following detailed description when considered in connection with the accompanying drawings wherein:

FIG. 3 is an elevational view of a second embodiment of the subject invention;

FIG. 4 is an elevational view of a third embodiment of the subject invention;

FIGS. 5A, 5B, 5C, 5D, 5E, 5F, 5G, 5H and 5I are patterns as they sequentially appear to operators of an approaching space vehicle, in accordance with the subject invention; and FIGS. 6A, 6B, 6C and 6D illustrate light patterns indicating different vehicle attitudes in accordance with the subject invention.

DESCRIPTION OF THE PREFERRED EMBODIMENT

Figure 1:
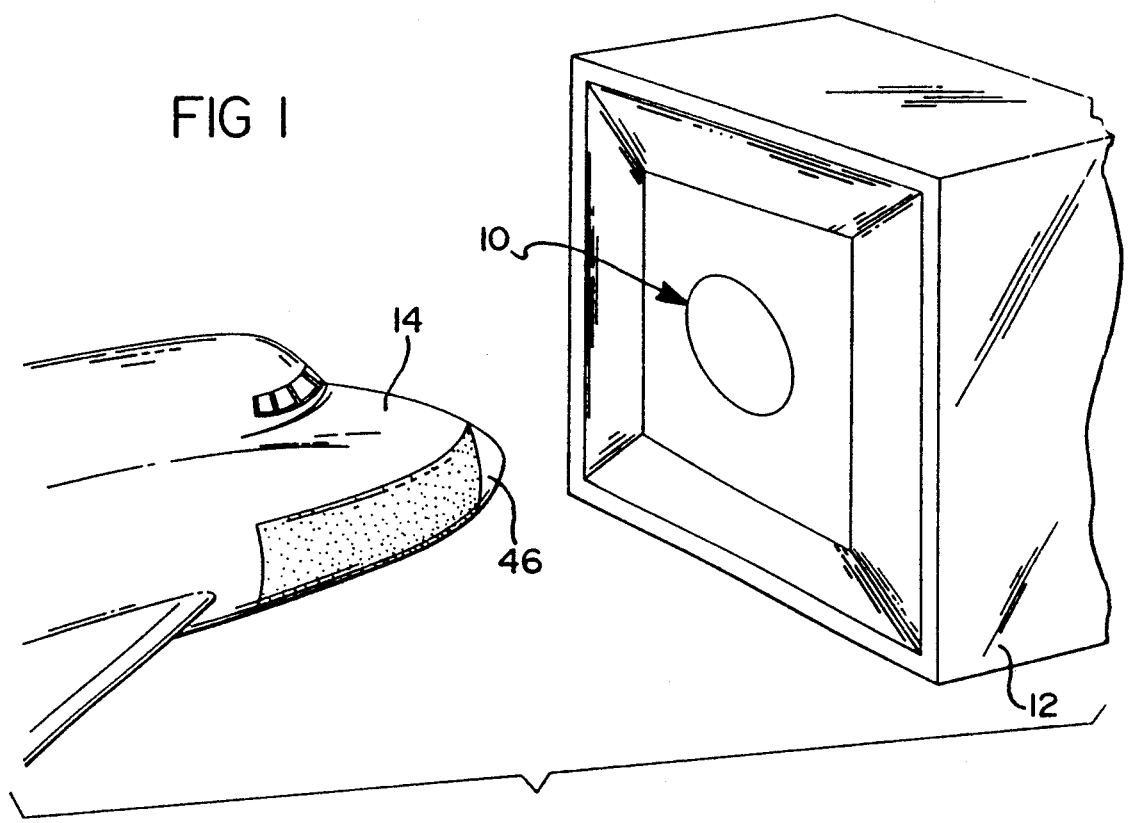
FIG. 1 is a perspective view of the subject invention in an exemplary location.

A docking target 10 is mounted on a station 12 for visually indicating to an approaching vehicle 14 its attitude and distance from the station 12 to assist in docking, as shown in FIG. 1. The subject invention will be disclosed with respect to docking a space shuttle vehicle 14 to a space station 12; however, it is to be understood that other docking applications may utilize the teachings of the subject invention. More particularly, the docking target 10 may be applied to other applications, such as aircraft docking at airports and a trailer truck backing into a loading dock.

The space station 12 utilizes "docking target lights" to assist in docking the shuttle 14 at the space station 12. As space shuttle 14 approaches the space station 12 for the docking, target 10 provides visual information of distance and on attitude, such as azimuth and elevation.

The docking target 10 includes a first position indicating means 16 for visually indicating range information to a vehicle 14 approaching target 10, and for visually indicating its relative attitude. Indicating means 16 emit light of a first luminous intensity to provide range information to the approaching vehicle in the following manner.

Indicating means 16 comprise a plurality of light emitting diodes (LEDs) D1 which emit red light of a predetermined luminous intensity. LEDs D1 are spaced about the circumference of an outer circle Cl on target assembly 10. As target 10 is approached, the circle of LEDs D1 become sequentially visible as a solid light spot that grows into a solid circle, which then grows into a circle of discrete points of red light.

A predetermined docking attitude occurs when vehicle 14 is aligned with the central axis A of target 10, which is perpendicular to target assembly 10. Each of the red light points 22 will appear to have equal intensity when vehicle 14 is on-axis of a predetermined desired docking attitude; they will appear to have unequal intensity when vehicle 14 is off-axis, as will be subsequently explained.

Figure 2:
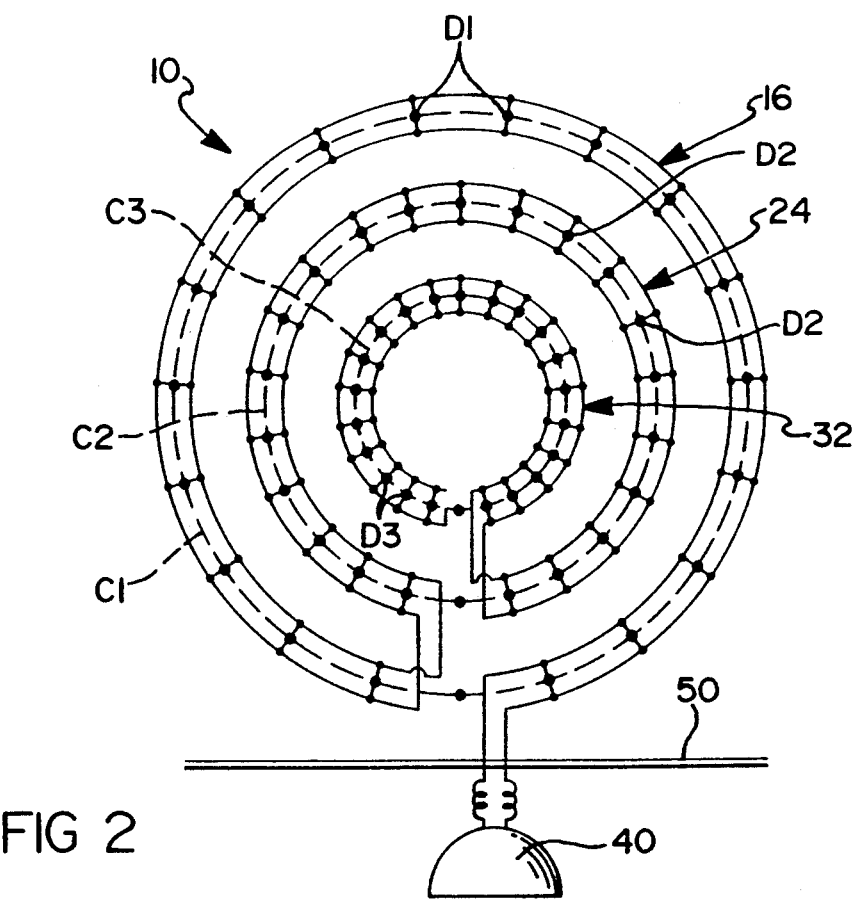
FIG. 2 is an elevational view of a first embodiment of the subject invention.

Target 10 includes a support means in the form of base 50, generally illustrated in FIGS. 2-4, for supporting the LEDs D1 arranged about circle C1.

The target 10 also includes a second position indicating means 24 located inwardly adjacent the first position indicating means 16 for visually indicating further attitude and range information to the approaching vehicle 14. The second position indicating means 24 comprises a circle C2 located concentric within circle C1 which is also mounted on support 50. The second position indicating means 24 comprises light emitting diodes (LEDs) D2 which emit yellow light of a predetermined luminous intensity.

Yellow LEDs D2 are first visible as a solid light spot 26 which likewise grows to a circle of yellow light and thence to a circle comprising discrete yellow light points within the circle of red light points, as will be later described.

Target 10 includes third position indicating means 32 of a geometric shape mounted on support 50 concentric within the first and second position indicating means 16, 24.

The third position indicating means 32 comprises a plurality of light emitting diodes (LEDs) D3 arranged about the circumference of a circle C3 mounted on support 50. They emit green light at a third predetermined luminous intensity. As with the red and yellow LEDs D1 and D2 of circles C1 and C2, LEDs D3 are visible initially as a solid green light spot 34, again growing to become a solid green circle and thence into a plurality of individual green light points.

In the FIG. 2 embodiment, the three concentric circles C1, C2, C3 cooperate to indicate the distance and attitude of the target assembly 10 of station 12 relative to an approaching vehicle 14. In this embodiment, the outermost circle C1 preferably has a diameter of two feet, the intermediate circle C2 has a diameter of about 1 1/16 feet, and the innermost circle C3 has a diameter of about 7/12 feet. The red LEDs D1, the yellow LEDs D2, and the green LEDs D3 are all mounted so that their optical or emission axes coincide (axis A) and are perpendicular to the support 50. Thus, circles C1, C2 and C3 are coplanar or are located on parallel planes.

Outer circle C1 of red LEDs D1 will be seen first as a glowing red spot 18 with no particular definition by the operator of vehicle 14. Then, depending on the operator's visual acuity, the single red spot 18 will resolve into a growing red circle or ring of light 20. As vehicle 14 comes closer, the red ring resolves into a ring of individual red dots or light points 22. Similarly, the yellow light spot 26 grows into a yellow circle or ring of light 28, which gradually resolves into individual yellow dots or light points 30 as the target approaches. The same occurs with the innermost circle C3 of the green LEDs D3 when the vehicle 14 is closest and "homes in" for the docking.

In the example disclosed herein, circle size, light number and intensity were chosen to relate to a shuttle vehicle 143 feet in length. The range or distance information provided by the concentric circles C1, C2 and C3 of red, yellow and green LEDs D1, D2 and D3 will now be explained with reference to FIGS. 5A-I.

The spacing of the LEDs D1, D2 and D3 on circles C1, C2, C3 is governed by the visual acuity of the human eye. The ultimate limit of visual acuity of the human eye is about one minute of arc. A limit of two minutes of arc is used as the basis of this example of the subject invention. This assumes that an observer cannot resolve several adjacent objects at a given distance or range as separate objects unless the image of each subtends an arc greater than two minutes.

When the operator first sees the docking target circles C1, C2, C3 at the target acquisition distance, he sees them as one spot, unresolved, e.g., the red light spot 18, at a distance of approximately 6455 feet. As he approaches closer, the size of the red LED spot grows then resolves into a circle or ring 20 at a threshold distance. This threshold distance is approximately at the point where the ratio of circle radius to the threshold distance is equal to the tangent of one minute of arc. The tangent of one minute of arc is:

tangent 1 minute = $2.9089 \times 10^{-4}$;

tangent 1 minute = circle radius/threshold distance.

Therefore, the threshold distance at which the spot begins to resolve into a circle or ring is:

threshold distance = circle radius/tangent 1 minute.

Hence, the red circle C1 becomes ring 20 at the threshold distance of about 3,438 feet; the yellow circle C2 becomes ring 28 at the threshold distance of about 2005 feet; and the green circle C3 becomes ring 36 at the threshold distance of about 1003 feet. In relation to lengths of a space shuttle, this corresponds to about 28, 16 and 8 shuttle lengths, respectively.

The individual LEDs D1, D2, D3 similarly will resolve into dots or light points 22, 30, 38 at distances which depend upon their spacing. The diameter of an LED light point used here is ⅛ inch. Using the same equation above, the light points 22, 30, 38 would be individually resolvable at the distances for the following spacing:

| LED DOT THRESHOLD DISTANCE AS A FUNCTION OF LED SPACING | |
| --- | --- |
| LED Spacing | Dot Threshold Distance (Feet) |
| 1 inch | 143 |
| 2 inches | 286 |
| 3 inches | 430 |
| 4 inches | 573 |
| 5 inches | 716 |

In this example, the circumference of the three circles is 75.4 inches for red circle C1, 44 inches for yellow circle C2, and 22 inches for green circle C3. The red circle C1 has its LEDs spaced four inches, which requires 19 red LEDs D1. Yellow circle C2 has its LEDs spaced two inches, yielding 22 yellow LEDs D2. Green circle C3 has its LEDs spaced one inch, producing 22 green LEDs D3. It is preferable that the green circle C3 be small, so that the threshold distance of its initial observance as dot 34 occurs closer to that of the red light points 18 threshold distance, thus requiring a number of green LEDs D3 comparable to the number of red LEDs D1. This would insure that the color mixing of the three colors would become dominated by the green LEDs D3. This makes for a better overlap with the other rings 20, 28. The following table defines the docking target light system of a preferred embodiment, designed for use in docking a space shuttle vehicle 143 feet in length, piloted by operators having good (20/20) vision. The shuttle pilot would acquire greater skill with practice in its use, and would establish his own visual acuity threshold as a function of distance in repeated use of the device.

| DOCKING TARGET LIGHTS | | | | | | | |
| --- | --- | --- | --- | --- | --- | --- | --- |
| | | Spot Threshold Distance | | Circle Threshold Distance | | Dot Threshold Distance | |
| Color | No. of LEDs per Circle | Feet | No. of Shuttle Lengths | Feet | No. of Shuttle Lengths | Feet | No. of Shuttle Lengths |
| Red | 19 | 6455 = | 53 | 3438 = | 28 | 573 = | 5 |
| Yellow | 22 | 2041 = | 16 | 2005 = | 16 | 286 = | 2 |
| Green | 22 | 1443 = | 12 | 1003 = | 8 | 143 = | 1 |

The red LEDs D1 have a luminous intensity of 3 candelas per LED, and hence, with 19 red LEDs D1 in the outermost circle C1, will have the greatest color visibility threshold range of the three LED colors used, over one mile. The yellow LEDs D2 have an intensity of 0.300 candelas per LED, and with 22 LEDs in the intermediate circle C2, will have a color visibility threshold range of over one-half mile. The green LEDs D3 intensity is 0.150 candelas per LED and, with 22 LEDs in the innermost circle C3, will have a color visibility threshold range of approximately one-half mile. Hence, each color spot 18, 26, 34 will be observed sequentially to provide distance information to the vehicle operator as he is coming in "on target."

FIGS. 5A-I illustrate the observable light configurations over a range of indicated distances of the first 16, second 24 and third 32 position indicating means. This range of distances comprises four subranges. FIG. 5A illustrates the appearance of red LEDs D1 as a red light spot 18 at the threshold distance of 6455 feet in the first subrange of distances. FIG. 5B illustrates the appearance of red LEDs D1 as ring of red light 20 at an intermediate distance of 3438 feet in the first subrange. FIG. 5C illustrates the appearance of red LEDs D1 as the ring of light 20 and the second plurality of LEDs D2 as a yellow light spot 26 at the threshold distance of 2041 feet in a second subrange of distances. FIG. 5D illustrates the appearance of target 10 at an intermediate distance in the second subrange, wherein both the red LEDs D1 and yellow LEDs D2 are visible as rings of light 20, 28, respectively.

FIG. 5E illustrates the appearance of 1443 feet in a third subrange of distances, wherein the red LEDs D1 and yellow LEDs D2 remain visible as rings of light 20, 28 and the green LEDs D3 are visible as the light spot 34 within the rings of light 20, 28. FIG. 5F illustrates the appearance of target 10 at a distance of 1003 feet in the third subrange, wherein all the red LEDs D1, yellow LEDs D2, and green LEDs D3 appear as concentric rings of light 20, 28, 36, respectively.

FIG. 5G illustrates the appearance of target 10 at the threshold distance of 573 feet in a fourth subrange of distances, wherein both the yellow LEDs D2 and green LEDs D3 appear as rings of light 28, 36 within a circle of discrete red LEDs D1 comprising individual light points 22. FIG. 5H illustrates the appearance of target 10 at an intermediate distance of 286 feet in the fourth subrange, wherein both the red LEDs D1 and yellow LEDs D2 are discernable as circles of individual light points 22, 30, while the green LEDs D3 remain a solid ring or circle of light 36. FIG. 5I illustrates the appearance of target 10 at close range (distance of 143 feet or one shuttle length), wherein all the red LEDs D1, yellow LEDs D22 and green LEDs D3 appear as circles of individual light points 22, 30, 38. In this manner, the shuttle pilot can readily determine his distance to target over a range (comprising four subranges) of distances from over one mile to one shuttle length to aid in docking.

The target 10 includes a single step-down transformer 40 to enable direct connection with the station's power. Turn-on and turn-off may be local or remote at a control center. Only 3.2 watts of power are needed. The A.C. transformer 40 includes a pair of wires connected to each LED D1, D2, D3 in parallel for powering and illuminating the LEDs D1, D2, D3. The transformer 40 may be mounted on the support 50 or extending therefrom. The support 50 may be any electrically insulated board for supporting the LEDs D1, D2, D3.

The target 10 provides visual range information, but requires the pilot to practice with it so that he calibrate himself relative to the successive colored visual images he sees as they relate to specific distances. It is a calibration of his personal acuity which corrects for any individual differences.

The LEDs D1, D2, D3 and the circles C1, C2, C3 also provide information indicating the attitude of the vehicle 14 relative to the station 12. The cone angle of the LED emission is 14° full cone to half power points, but full power between 6° to −8° relative to their optical axes. The LEDs D1, D2, D3 include lenses centered on their optical axis to produce the cone angle for concentrating the emitted light to an area within the cone angle.

When the approaching vehicle 14 is on-axis A, the predetermined desirable docking attitude, all visible LEDs D1, D2, D3 within circles C1, C2, C3 appear equally bright and are at their maximum brightness for each circle C1, C2, C3 as illustrated in FIG. 6A, which depicts only a single circle for the sake of simplicity. Although FIGS. 6A–D illustrate only one circle, each circle C1, C2, C3 will be substantially similar in appearance when on- or off-axis A and when at its respective light point threshold distance. When the approaching vehicle 14 is off-axis from its predetermined docking attitude within 0° to 90°, the LEDs D1, D2, D3 indicate approximate off-axis angles as follows.

If the vehicle 14 is at a small angle off-axis, the circle will remain essentially circular. The off-axis direction relative to the center axis A will be indicated by the nearest LEDs appearing brighter than the other LEDs, as illustrated in FIG. 6B. The nearest LEDs are visible within the cone angle while the furthest LEDs are outside the cone angle. If the vehicle 14 is at a large angle off-axis, the off-axis direction relative to the center axis A of target 10 is indicated by the nearest LEDs appearing dimmer than the other LEDs as illustrated in FIG. 6C.

At the threshold angle at which the lens is discontinued over the LED but a side view of the LED has now been reached, the LED appears dimmer. Therefore, the threshold angle is achieved at the furthest LEDs and not at the near LEDs in FIG. 6B. The reverse is true with respect to FIG. 6C, where the rear LEDs are viewed from the side which appear brighter. If the vehicle 14 is at a very large angle off-axis, all the LEDs appear equally bright due to a side view of all glowing junctions, but the circles C1, C2, C3 appear to be ellipses, as illustrated in FIG. 6D.

A second embodiment of the invention is shown in FIG. 3 and adds a reflector 42 within ring 32. Reflector 42 is provided for reflecting a laser beam from the approaching vehicle 14 to indicate the vehicle attitude. The vehicle 14 includes a laser (not shown) for producing a laser beam which is directed at the reflector 42, which can be a corner reflector. A receiver 46 on the vehicle 14 receives the reflected laser beam which, in combination with the on-axis or off-axis views of the LED circles, aid the operator in achieving on-axis docking. As an alternative to a corner reflector 42, a flat mirror which operates in a similar manner as the reflector 42, and with the same equipment on the vehicle 12, may be used. In this case, receiver 46 receives the reflected laser beam only if the shuttle is precisely on-axis.

A third embodiment of the invention is shown in FIG. 4 and comprises a circular disk 44 within the ring 32. The circular disk 44 comprises a white matte disk having three concentric black circles. The vehicle operator may additionally visually observe vehicle attitude along with laser spot location.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A docking target mounted on a station for providing visual information enabling determination of attitude and distance of an approaching vehicle relative to the station over a range of distances to assist in the docking of the vehicle with the station, said target comprising:

a support (50), first position indicating means (16) mounted on support (50) for continuously emitting light of a first predetermined luminous intensity visible to the approaching vehicle (14) to enable determination of a first subrange of distances between approaching vehicle (14) and said target, characterized by including second position indicating means (24) mounted on support (50) adjacent said first indicating means (16) for continuously emitting light of a second and lesser predetermined luminous intensity visible to approaching vehicle (14) to enable determination of a second subrange of distances less than said first range between approaching vehicle (14) and said target (10) in conjunction with said first indicating means, wherein only said first position indicating means (16) is visible at said first subrange and both said first and said second position indicating means (16, 24) are visible at said second subrange, and further characterized by said first position indicating means (16) and said second position indicating means (24) having geometric shapes, and being arranged with said second position indicating means (24) concentric about a common center with said first position indicating means (16).

2. A docking target as set forth in claim 1, further characterized by including third position indicating means (32) for visually indicating to the approaching vehicle (14) a third subrange of distances less than said first and second subranges between the approaching vehicle (14) and said target (10) in conjunction with said first and second indicating means, said third position indicating means (32) having a geometric shape and being arranged concentric about a common center with said first position indicating means (16) and said second position indicating means (24).

3. A docking target mounted on a station for providing visual information enabling determination of attitude and distance of an approaching vehicle relative to the station over a range of distances to assist in the docking of the vehicle with the station, said target comprising:

first position indicating means (16) for continuously emitting light of a first predetermined luminous intensity visible to the approaching vehicle (14) to enable determination of a first subrange of distances between the approaching vehicle (14) and said target, characterized by said first position indicating means (16) comprising a first plurality of light emitting means (D1) arranged about the circumference of a first circle (C1) for emitting visible light of a first color at said first luminous intensity such that said first plurality of light emitting means (D1) are visible as a solid light spot (18) of the first color at the threshold distance of said first subrange of distances, and by including second position indicating means (24) adjacent said first indicating means (16) for continuously emitting light of a second and lesser predetermined luminous intensity visible to the approaching vehicle (14) to enable determination of a second subrange of distances less than said first range between the approaching vehicle (14) and said target (10) in conjunction with said first indicating means, wherein only said first position indicating means (16) is visible at said first subrange and both said first and said second position indicating means (16, 24) are visible at said second subrange, said second position indicating means having a geometric shape, and being arranged concentric with said first position indicating means (16).

4. A target as set forth in claim 3, further characterized by the first plurality of light emitting means being of such intensity as to be visible as a circle of light at a predetermined intermediate distance in said first subrange.

5. A target as set forth in claim 3, further characterized by said first indicating means appearing as a circle of firs color light at the threshold distance of said second subrange of distances, and said second position indicating means (24) comprising a second plurality of light emitting means (D2) arranged about the circumference of a second circle (C2) for emitting visible light of a second color at said second luminous intensity such that said second plurality of light emitting means (D2) are visible as a solid light spot (26) of said second color within said ring of light (20) of said first color at a first intermediate distance.

6. A target as set forth in claim 4, further characterized by the second plurality of light emitting means being of such intensity as to be visible as a circle of light within the first circle of light at a predetermined intermediate distance in said second subrange.

7. A target as set forth in claim 6, further characterized by including third position indicating means (32) for visually indicating to the approaching vehicle (14) a third subrange of distances less than said first and second subranges between the approaching vehicle (14) and said assembly (10) in conjunction with said first and second indicating means, said third position indicating means (32) having a geometric shape and being arranged concentric with said first position indicating means (16) and said second position indicating means (24).

8. A target as set forth in claim 7, further characterized by the third position indicating means comprising a third plurality of light emitting means (D3) arranged about the circumference of a third circle (C3) for continuously emitting light of a third color visible as a solid light spot (34) within the second circle of light (28) at the threshold distance of the third subrange of distances.

9. A target as set forth in claim 8, further characterized by the third plurality of light emitting means (D3) being of such intensity as to be visible as a circle of light (36) within the second circle of light (28) at a predetermined intermediate distance in said third subrange.

10. A target as set forth in claim 9, further characterized by the first plurality of light emitting means (D1) being of such number and at such spacing as to become visible as discrete points of light (22) at the threshold distance of a fourth subrange of distances.

11. A target as set forth in claim 10, further characterized by the second plurality of light emitting means (D2) being of such number and at such spacing as to become visible as discrete points of light (30) at a distant intermediate distance of the fourth subrange of distances.

12. A target as set forth in claim 11, further characterized by the third plurality of light emitting means (D3) being of such number and at such spacing as to become visible as discrete points of light (38) at a close intermediate distance of the fourth subrange of distances.

13. A target as set forth in claim 5, further characterized by each of said first plurality of light emitting means (D1) having an emission axis (A) perpendicular to the plane of the first circle for indicating attitude of the approaching vehicle (14) with respect to said assembly, each of said first plurality of light emitting means (D1) appearing to have equal luminous intensity at a predetermined vehicle attitude along said emission axis and said first plurality of light emitting means (D1) appearing to have unequal luminous intensity when the vehicle is misaligned from said predetermined docking attitude off said emission axis.

14. A target as set forth in claim 13, further characterized by each of said second plurality of light emitting means (D2) having an emission axis perpendicular to said first and second circles (C1, C2) for indicating attitude of the approaching vehicle (14) with respect to said assembly, each of said second plurality of light emitting means (D2) appearing to have equal luminous intensity at said predetermined vehicle attitude and said plurality of light emitting means (D2) appearing to have unequal luminous intensity when misaligned from said predetermined docking attitude.

15. A target as set forth in claim 9, further characterized by including fourth position indicating means 42) mounted within the third position indicating means (C2) and said fourth position indicating means (42) comprising a reflector within said third circle of light (36) of said third color for receiving and reflecting a laser beam from the approaching vehicle to indicate vehicle docking attitude.

16. A target as set forth in claim 15, further characterized by said fourth position indicating means comprising a circular disk (42)

17. A target as set forth in claim 16, further characterized by said circular disk comprising a white matte disk (44) having three concentric circles imprinted thereon.

18. A target as set forth in claim 14, further characterized by said first plurality of light emitting means (D1) comprising light emitting diodes emitting visible light at said first luminous intensity.

19. A target as set forth in claim 18, further characterized by said second plurality of light emitting means (D2) comprising light emitting diodes emitting light at said second luminous intensity.

20. A docking target for mounting to a station for visually indicating attitude and position to an approaching vehicle for the docking thereof, said assembly characterized by comprising:

support means (50);

position indicating means (16) mounted on said support means (50) for continuously emitting visible light to indicate distance and attitude of the approaching vehicle (14) to said target 10;

said position indicating means (16) comprising a plurality of light emitting means (D1) of equal luminous intensity each having a narrow cone angle of light emission arranged in a geometrical pattern in a plane (C1) mounted on said support means (50) for emitting visible light to indicate attitude of the vehicle (14) with respect to said target assembly (10), wherein said plurality of light emitting means (D1) all appear to have equal intensities when they are viewed within their cone angles at a predetermined docking attitude and to have unequal intensities when some are viewed within and some are view outside their cone angles when the vehicle (14) has deviated slightly from said predetermined docking attitude.

21. An assembly as set forth in claim 20, further characterized by each of said plurality of light emitting means (D1) having an emission axis (A) perpendicular to said plane (C1) for indicating attitude of the approaching vehicle (14) with respect to said target assembly, said predetermined docking attitude being along said emission axis.

22. A docking target for mounting to a station for visually indicating attitude and position to an approaching vehicle for the docking thereof, said assembly characterized by comprising:

support means (50);

position indicating means (16) mounted on said support means (50) for continuously emitting visible light to indicate distance and attitude of the approaching vehicle (14) to said target 10;

said position indicating means (16) comprising a plurality of light emitting means (D1) of equal luminous intensity each having a narrow cone angle of light emission arranged in a circular pattern in a plane (C1) mounted on said support means (50) for emitting visible light to indicate attitude of the vehicle (14) with respect to said target assembly (10), wherein said plurality of light emitting means (D1) appear to all have equal intensities when they are viewed within their cone angles at a predetermined docking attitude, appear to have unequal intensities when some are viewed within and some are viewed outside their cone angles when the vehicle (14) has deviated slightly from said predetermined docking attitude, and appear to all have diminished intensities when all are viewed outside their cone angles when the vehicle (14) has deviated further from said predetermined docking attitude.

* * * * *